United States Patent
Hsieh

(10) Patent No.: US 6,374,996 B1
(45) Date of Patent: Apr. 23, 2002

(54) CIRCUIT BOARD CARRIER

(76) Inventor: Tsung-Chang Hsieh, No. 57, Yung An Street, Lung-Tan Hsiang (TW)

( * ) Notice: Subject to any disclaimer, the term of this patent is extended or adjusted under 35 U.S.C. 154(b) by 0 days.

(21) Appl. No.: 09/609,706

(22) Filed: Jul. 3, 2000

(51) Int. Cl.[7] ............................................. B65G 25/00
(52) U.S. Cl. ........................... 198/750.12; 198/468.4; 414/797; 414/752.1; 901/16; 901/17
(58) Field of Search ...................... 198/468.4, 750.12; 414/797, 416, 225.01, 752.1; 901/16, 17

(56) References Cited

U.S. PATENT DOCUMENTS

| | | | | |
|---|---|---|---|---|
| 3,587,888 A | * | 6/1971 | Warren | 198/468.4 X |
| 3,865,253 A | * | 2/1975 | Haely | 414/627 |
| 4,370,092 A | * | 1/1983 | Healy | 414/752.1 |

* cited by examiner

Primary Examiner—Stephen T. Gordon
Assistant Examiner—Patricia Engle
(74) Attorney, Agent, or Firm—Rosenberg, Klein & Lee

(57) ABSTRACT

The present invention relates to a circuit board carrier including a carrier sliding between a conveyor and a holder disposed at the lower part of a main machine. The carrier includes a sliding rail disposed at the top of a main machine above the conveyor and the holder; a sliding base being on the sliding rail by means of a sliding recess thereof; a sliding rod disposed above the sliding base and being vertically spaced to the sliding rail; a sliding seat being slid on the sliding rod by means of a sliding piece and having a shaft post at the top thereof; a pivot sleeve pivoted on the shaft post of the sliding seat by means of a bearing thereof and having a connection groove; a turning arm, one end of which is connected to the connection groove of the pivot sleeve while the other end thereof is connected to a motor and a driving axle of a reduction machine; and a suction unit installed under the sliding base. Accordingly, the circuit board can be conveyed in a manner of simple harmony motion to reach a stable conveyance.

1 Claim, 6 Drawing Sheets

CIRCUIT BOARD CARRIER

BACKGROUND OF THE INVENTION

1. Field of the Invention

The present invention relates to a circuit board carrier, and more particularly to a carrier which carries circuit boards in a manner of simple harmony motion in order to achieve a stable conveyance without shaking.

2. Description of the Prior Art

A conventional circuit board carrier 1, as shown in FIG. 1, is primarily operated in a manner that the circuit boards (P) is sucked by a sucking device 11 which is controlled by a pneumatic cylinder 12 to shift the circuit boards (P) between a conveyor 2 and a holder 3. Due to the short conveyance distance, a smooth motion can't, however, be achieved to set the sucking device 11 in position even if a most precise pneumatic cylinder 12 is used. A momentary deceleration in reaching a certain point will shake the whole machine so that the precision will greatly influenced.

SUMMARY OF THE INVENTION

It is a primary object of the present invention to provide a circuit board carrier which has a sucking device disposed under a sliding base above which a pair of sliding rod and sliding piece are disposed vertically to the sliding direction. The sliding piece includes a sliding seat on which a pivot sleeve is mounted. The pivot sleeve is attached with a turning arm which is driven by a motor in order to bring the sucking device to make a simple harmony motion with the sliding base. Accordingly, a stability can be achieved in carrying the circuit boards.

BRIEF DESCRIPTION OF THE DRAWINGS

The accomplishment of this and other objects of the invention will become apparent from the following description and its accompanying drawings of which.

DETAILED DESCRIPTION OF THE PREFERRED EMBODIMENT

Figure 1:
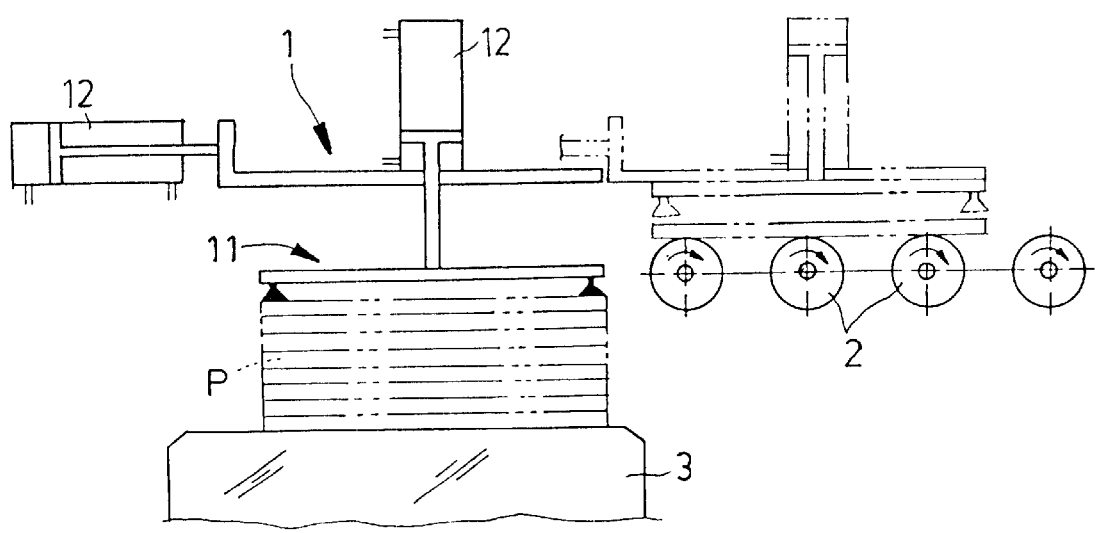
FIG. 1 is a schematic drawing of a circuit board carrier in conveying the circuit board by means of a pneumatic cylinder.
Figure 2:
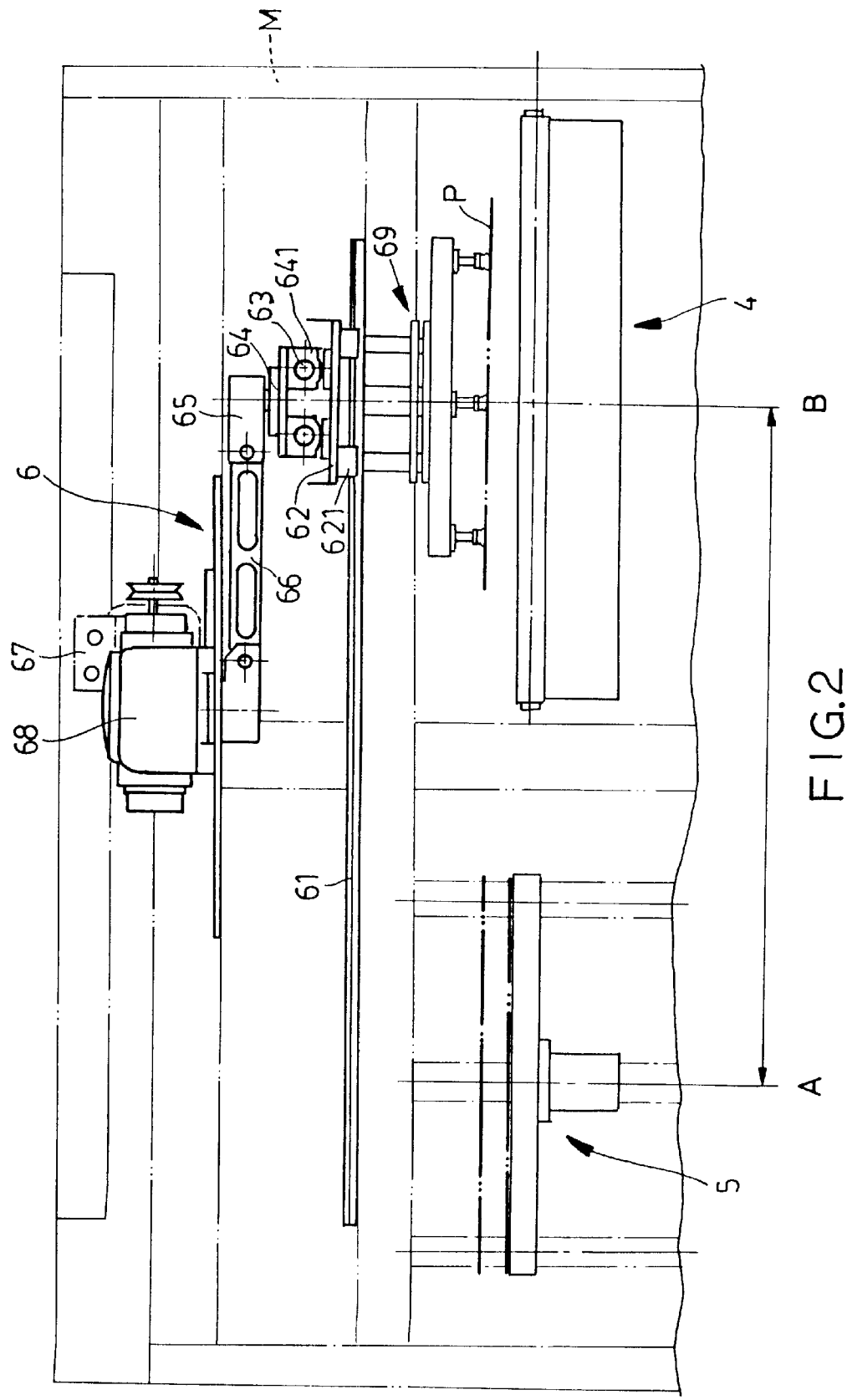
FIG. 2 is a schematic drawing of the arrangement of an embodiment of the present invention.
Figure 3:
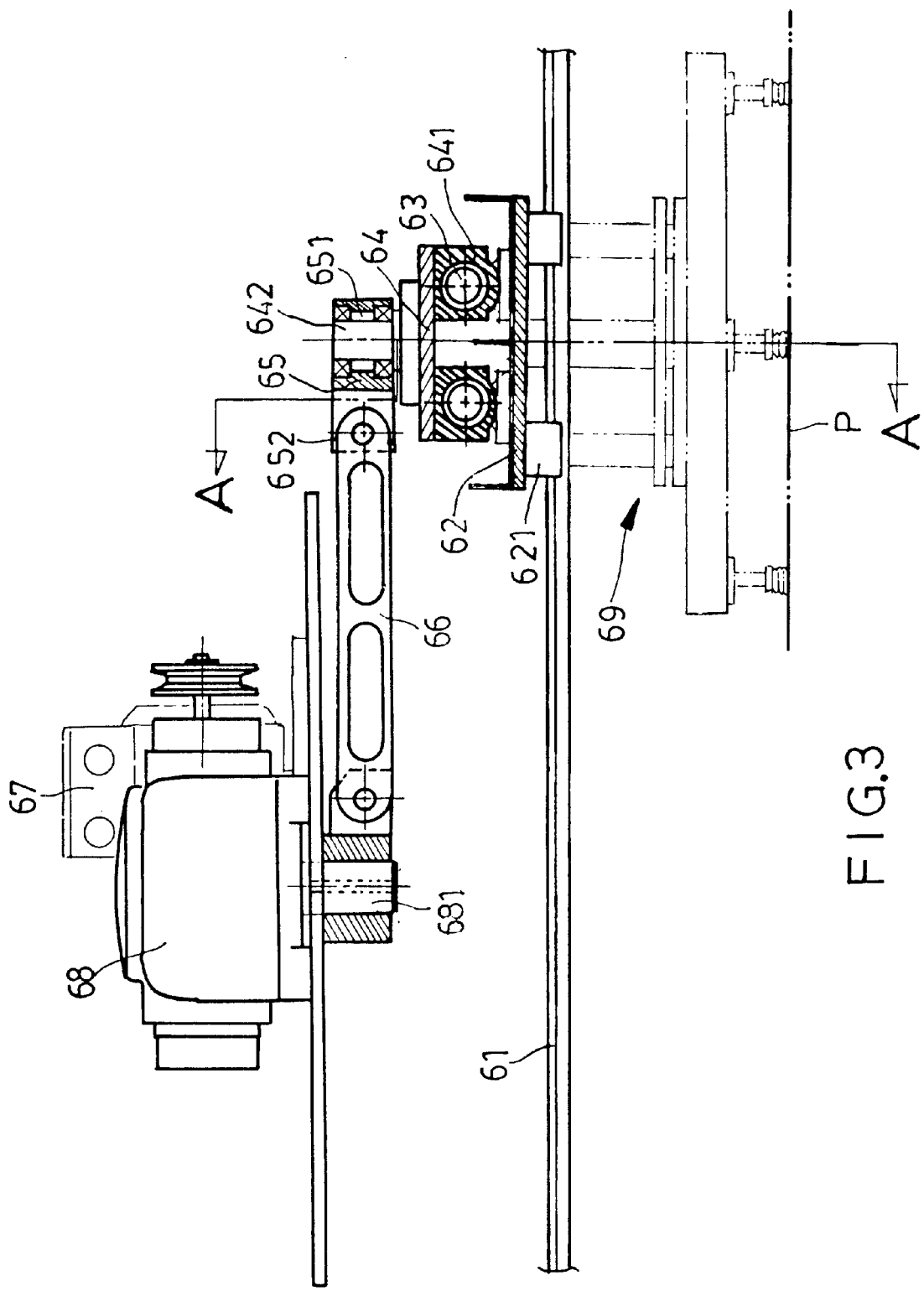
FIG. 3 is a longitudinal section of the embodiment of the present invention.
Figure 4:
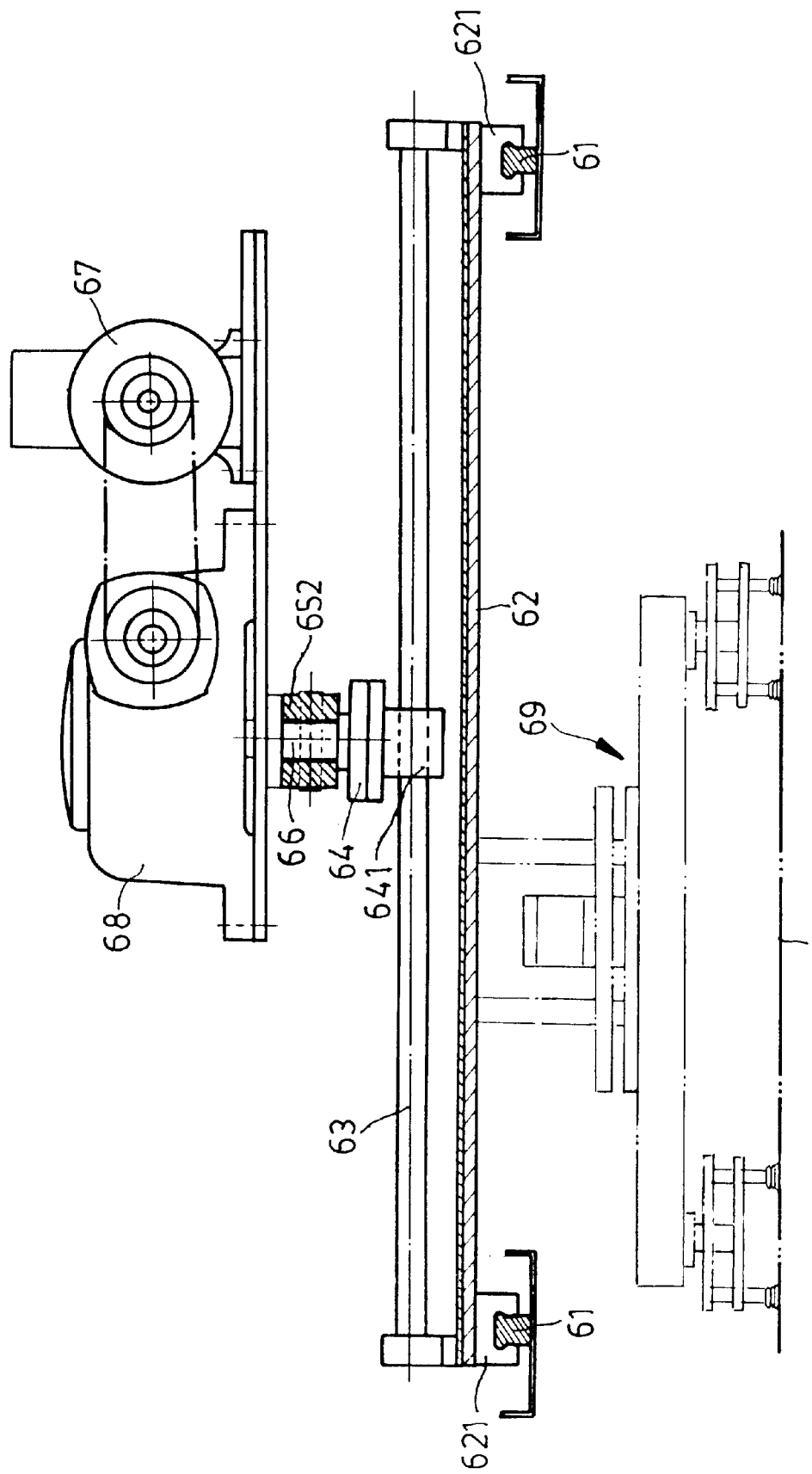
FIG. 4 is a sectional view taken along the line A—A of FIG. 3.
Figure 5:
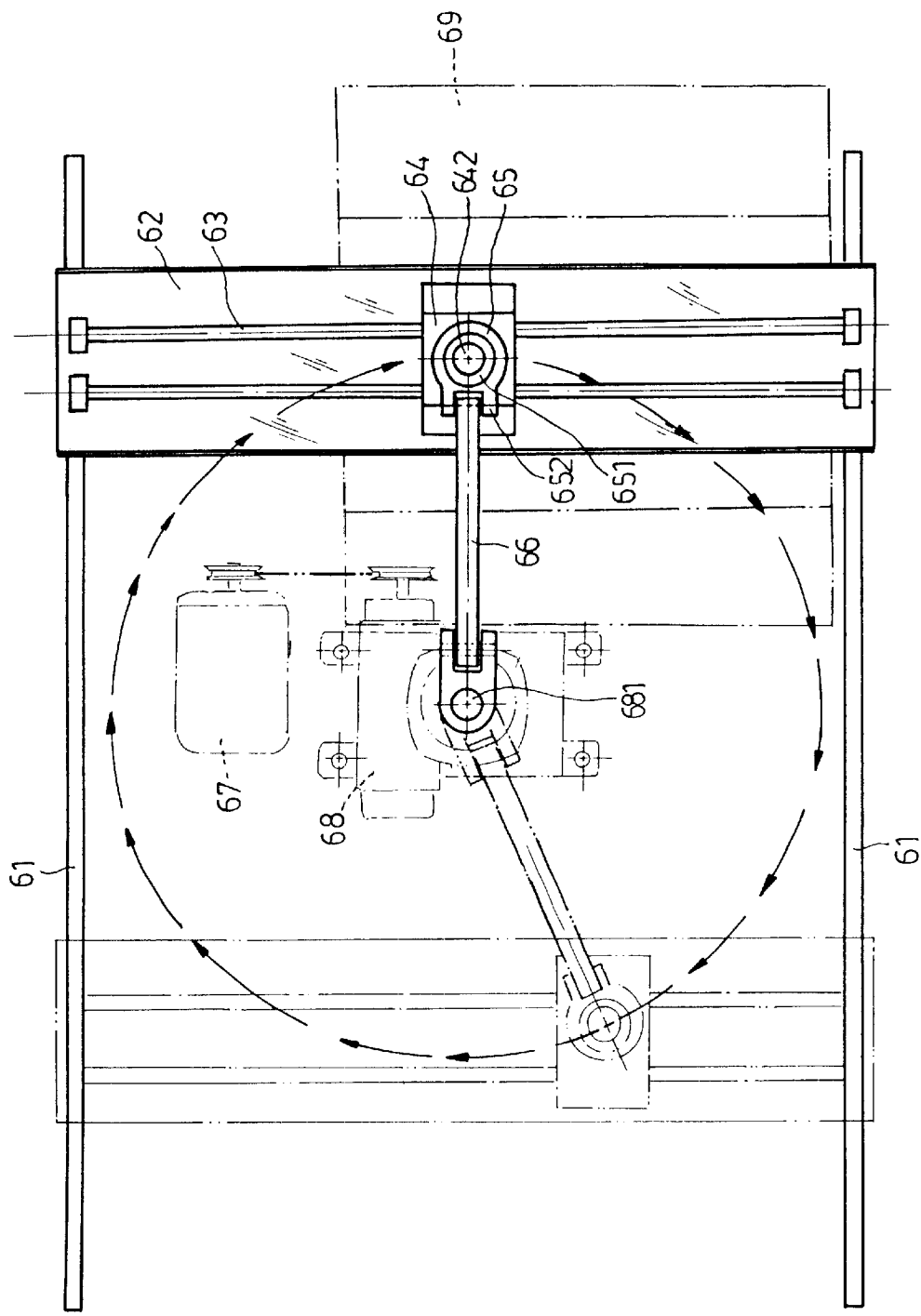
FIG. 5 is a top view of the embodiment of the present invention.
Figure 6:
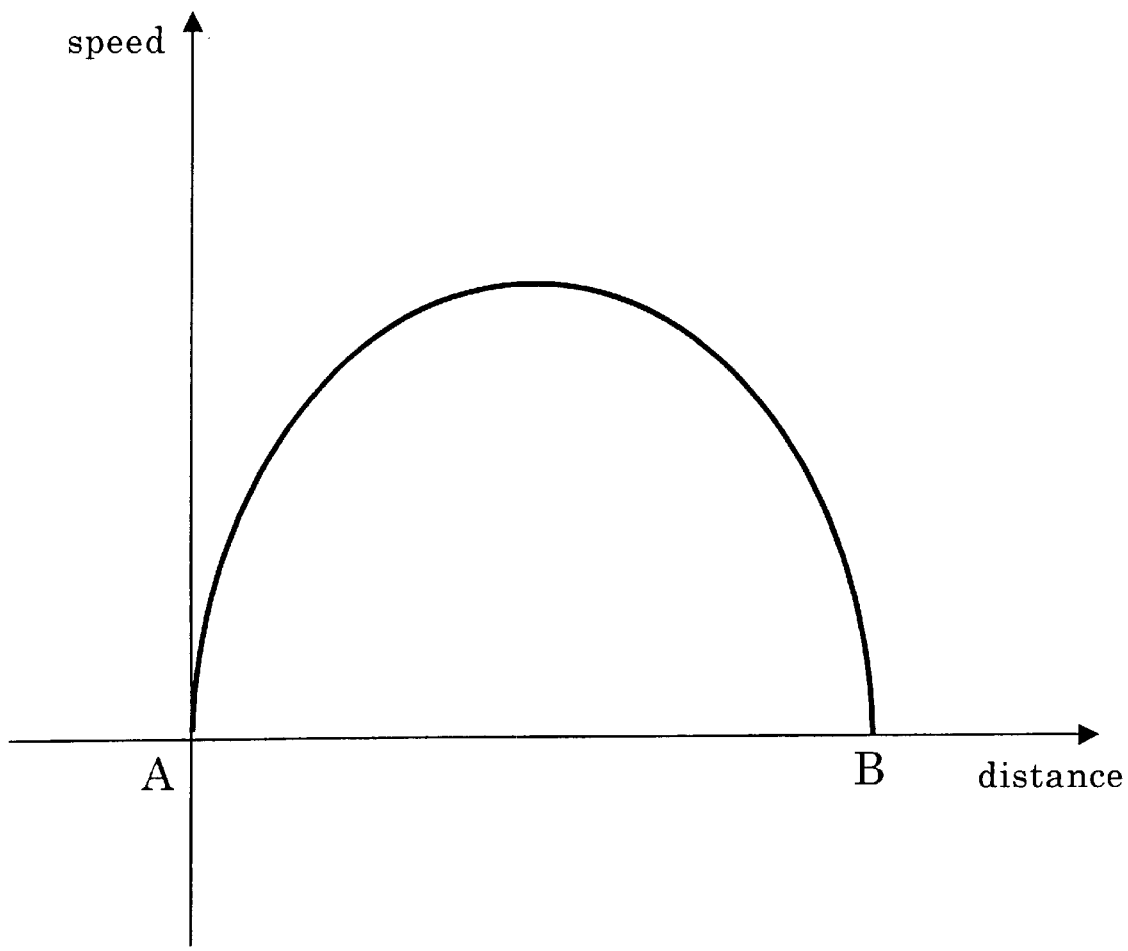
FIG. 6 is a drawing showing the relation between the speed and the distance in a motion state of the present invention.

First of all, referring to FIGS. 2 and 5, the circuit board carrier in accordance with the present invention primarily has a carrier 6 sliding between a conveyor 4 and a holder 5 disposed ast the lower part of main machine (M) wherein the carrier 6 includes:

a sliding rail 61 disposed at the tope of the main machine (M) above the conveyor 4 and the holder 5;

a sliding base 62 being slid on the sliding rail by means of sliding recess 621 thereof;

a sliding base 63 disposed above the sliding base 62 and being vertically spaced to the sliding rail 61;

a sliding seat 64 being slid on the sliding rod 63 by means of a sliding piece 641 and having a shaft post 642 at the top thereof;

a pivot sleeve 65 on the shaft post 642 of the sliding seat 64 by means of a bearing 651 thereof and having a connection groove 652;

a turning arm 66, one end of which is connected to the connection groove 652 of the pivot sleeve 65 while the other end hereof is connected to a motor 67 and a driving axle 681 of a reduction machine 68; and a suction unit 69 installed under the sliding base 62.

In accordance with the above structure of the present invention, the power of the motor 67 will be increased in a manner of torsion by means of the reduction machine 68. Thereafter, the turning arm 66 is driven for turning by means of the driving axle 681 of the reduction machine 68 so that the pivot sleeve 65 is accordingly turned. However, the sliding rod 63 can slide only along the direction of the sliding rod 63 owing to the limited degree of freedom of the sliding seat 64. Accordingly, the sliding base 62 is driven to slide on the sliding rail 61 with the rotation motion of the turning arm 66. Therefore, the circuit board (p) sucked by the suction unit 69 under the sliding base 62 will be smoothly conveyed in a manner of simple harmony motion from the conveyor 4 to the holder 5, or from the holder 5 to the conveyor 4.

Accordingly, the way of the present invention to convey the circuit boards in the manner of simple harmony motion is more stable than the conventional way by means of the momentary acceleration or deceleration of the pneumatic cylinder.

Many changes and modifications in the above-described embodiment of the invention can, of course, be carried out without departing from the scope thereof. Accordingly, to promote the progress in science and the useful arts, the invention is disclosed and is intended to be limited only by the scope of the appended claim.

What is claimed is:

1. A circuit board carrier comprising a carrier sliding between a conveyor and a holder disposed at a lower part of a main machine wherein said carrier includes:

a sliding rail disposed at an upper part of the main machine above said conveyor and said holder;

a sliding base being slid on said sliding rail by means of a sliding recess thereof;

a sliding rod disposed above said sliding base and being vertically spaced to said sliding rail;

a sliding seat being slid on said sliding rod by means of a sliding piece and having a shaft post at a top portion thereof;

pivot sleeve pivoted on said shaft post of said sliding seat by a bearing and having a connection groove;

a turning arm having one end thereof connected to said connection groove of said pivot sleeve while another end of said turning arm is connected to a motor and a driving axle of a reduction machine; and a suction unit installed under said sliding base.

* * * * *